3,040,003
SYNTHETIC POLYMERS

Ralph G. Beaman, Wilmington, Del., assignor to E. I. du Pont de Nemours and Company, Wilmington, Del., a corporation of Delaware
No Drawing. Filed July 10, 1958, Ser. No. 747,592
11 Claims. (Cl. 260—77.5)

This invention relates to condensation polymers and more particularly to new high molecular weight synthetic linear condensation polymers characterized by the presence of recurring structural units containing amide linkages formed from diaminopiperazines and a difunctional organic coreactant.

Although a large number of synthetic organic polymers which contain the amide linkage as a part of the chain-extending structure have been developed for many diverse applications such as textile and industrial fibers, coating compositions, molding powders, films, and the like, advancing technology creates a constant demand for polymers with improved properties. This is particularly true for those condensation polymers containing the amide linkage where fume-, light- and heat-stability and good solubility and dyeability are desired.

It is, therefore, an object of this invention to provide new synthetic condensation polymers containing the amide linkage which exhibit improved fume-, light- and heat-stability together with improved solubility while still retaining desirable physical properties. It is another object of this invention to provide synthetic elastomeric polymers which are resistant to degradation and loss of physical properties upon exposure to radiation in the visible range. A further object of this invention is to provide synthetic polymers having improved solubility in common organic polar solvents which are capable of being formed into shaped articles. Still another object is to provide polymers which can be shaped into filaments which have high elastic recovery and which do not require curing or cross-linking to obtain these properties. Other objects will be apparent from the following detailed discussion.

The objects of this invention are accomplished by providing high molecular weight synthetic linear condensation polymers comprised of the condensation product of a 1,4-diaminopiperazine and a difunctional organic coreactant having at least two end groups capable of reacting with active hydrogen atoms, said polymers being further characterized by the presence of repeating units as an integral part of the polymer chain represented by the structural formula

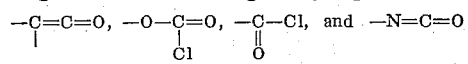

wherein Y represents a divalent organic radical identical to that remaining after removal of the terminal

containing portions of the terminal reactive groups of a difunctional organic compound having two identical terminal reactive groups selected from the class consisting of acid halide, haloformate, carboxyl, ester, ketene, and isocyanate groups, $R_2$, $R_3$, $R_5$, and $R_6$ are selected from the group consisting of hydrogen and lower alkyl containing from one to four carbon atoms, and X is selected from the group consisting of oxygen and sulfur. The terminal reactive groups are reactive with the diaminopiperazine to provide the intralinear

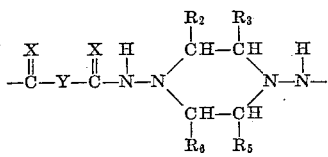

groups in the repeating units defined by the aforementioned structural formula. The difunctional organic coreactant referred to may be a low molecular weight polymer or a monomer, each having end groups capable of reacting with active hydrogen but otherwise free of substituents capable of reacting with active hydrogen. The molecular weight of these low molecular weight polymers should be above 700, and is preferably between 800 and 8000.

Surprisingly, the 1,4-diaminopiperazines and the difunctional organic coreactants described above react readily, with good yields, to give substantially linear polymers which possess an enhanced degree of light stability on exposure to light in the visible range as well as improved solubility. When compared with products such as those described in copending U.S. application Serial No. 556,071, filed December 29, 1955, in which hydrazine is used to form amide linkages, the aforementioned properties are outstanding. The polymers of the copending application are characterized by a structural feature in which the nitrogens of the hydrazine are each connected to an acyl group, thus reducing the basicity of the nitrogen and consequently reducing the dyeability of the resultant polymer. The polymers of the present invention, being characterized by the recurring linkage shown above, have a nitrogen atom in the chain which is not acyl-substituted and, therefore, retains a higher degree of basicity. However, this nitrogen is not as basic as amino nitrogen, that is a nitrogen attached only to carbon and hydrogen. It is believed that the absence of an alpha hydrogen adjacent to the amide linkage and the delicate balance of basicity achieved in the recurring units lead to the improved properties mentioned above.

The difunctional organic coreactants used in preparing the products of this invention are derived from compounds having at least two terminal reactive groups containing carbon atoms attached to oxygen or sulfur through a double bond. Examples of these coreactants are divalent organic reactants having end groups such as $$-C{=}C{=}O,\ -O-C{=}O,\ -C-Cl,\ \text{and}\ -N{=}C{=}O$$

and similar groups in which sulfur replaces the oxygen on the terminal carbon atom. As previously indicated, these coreactants may be monomers or low molecular weight polymers.

Throughout the specification, the terms "macro-intermediate" and "low molecular weight polymer" will be used interchangeably to designate any homopolymer or copolymer having a molecular weight above 700 which has at least two groups capable of reacting with active hydrogen atoms of the diaminopiperazine to form the repeating linking units previously described. These macro-intermediates may contain a single type of linkage such as the ether linkages in the polyalkylene oxides or the ester linkages in polyesters, or they may have more than one type of linkage such as polyoxathiaalkylene. Even where the linkages are the same, the compositions may be copolymers such as a copolyester or a copolyether. The macro-intermediate may be selected from groups such as polyether, polyether thioether, polyester, polyurethane, polyurea, polyamide, polysulfonamide, hydrocarbon, polysiloxane, and the like, as will be further demonstrated herein. The polymer chains may contain aromatic groups, and they may be substituted with halogen, alkyl, nitro, alkoxy, and similar groups which do not interfere with the subsequent polymerization under the conditions being used. Although the polymers obtained will be termed "substantially linear polymers," it is not intended that polymers which have branches extending from the main polymer chain be excluded. However, substitution on the polymer chain or branching which would interfere with polymerization or would promote cross-linking during polymerization is to be avoided.

In general, the reactants used in preparing the polymers of this invention may be prepared by known methods. The N,N'-diaminopiperazines may be prepared by (1) nitrosation of a piperazine, (2) zinc-acetic acid reduction of the dinitroso-piperazine, (3) isolation of the bis-hydrazine by precipitation in the form of its dihydrochloride, and (4) regeneration of the free base by treatment of the salt with alcoholic potassium hydroxide. The various difunctional coreactants, i.e., monomers and macro-intermediates, may be prepared by known methods.

Polymerization of the reactants is preferably carried out in a solvent medium. Suitable solvents include N,N-dimethylformamide, N,N-dimethylacetamide, tetrahydrofuran, tetramethylurea, dimethyl sulfoxide, Cellosolve, and mixtures of tetrachloroethylene with N,N-dimethylformamide. Acid acceptors are used in the system when an acid is liberated by the reaction to facilitate formation of high molecular weight polymers. The temperatures employed will, of course, vary with the particular reactants being polymerized, generally moderate temperatures may be used, with temperatures at or near room temperature being preferred, particularly for the elastomers, since infusible insoluble gels tend to form at temperatures much above about 40° C. In addition, the polymers may be prepared by direct mixing of the ingredients or by interfacial polymerization in a manner similar to that described in copending application Serial No. 556,071.

Among the polymers from 1,4-diaminopiperazines, those which are formed by reaction of aromatic based diisocyanates with 1,4-diaminopiperazine are preferred. This species contains the linkage,

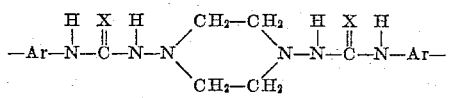

where —Ar— denotes a divalent aromatic radical attached on at least one end directly, i.e., without intervening methylene or other groups, to the nitrogen of the amide linkage, and X represents oxygen or sulfur. Among these polymers, the polyether-urethane based elastomers formed by the reaction of aromatic-isocyanate-ended macro-intermediates with 1,4-diaminopiperazine described in Example I which follows are particularly desirable. Polymers of this chemical composition, while retaining the advantageous physical properties of polymers described in the aforementioned copending application Serial No. 556,071 have, i.e. in addition to the very useful high elongation and tensile recovery described for those materials, an increased stability on exposure to fumes from a burning gas jet or other source of gaseous combustion products as well as to visible light which renders them particularly useful in certain applications where such exposure may occur, and an increased dyeability, especially with acid dyes.

Among the other polymers of this invention are polyurethanes prepared from 1,4-diaminopiperazines and macro-intermediates obtained by reacting bis-chloroformates of glycols with a primary or secondary diamine. In addition, polyureas may be prepared by reacting diamines with phosgene, or reacting phosgene with a diamine to form a bis-carbamyl chloride which is subsequently reacted with another diamine or more of the same diamine to form a polyurea, or by reacting a diamine with a diisocyanate. Polyamides may be prepared by reacting acids or their amide-forming derivatives, particularly the acid halides, with diamines.

As used herein, inherent viscosity is calculated as $$\eta_{inh} = \frac{\ln \eta_{rel}}{C}$$

where $\eta_{rel}$ is the flow time for a dilute solution of the polymer in a capillary viscometer divided by the flow time for the pure solvent, both being measured at 30° C. ln is the natural logarithm, and C is equal to 0.5. In the examples which follow, the inherent viscosity of the products obtained is given as an indication of the degree of polymerization. For film- and fiber-forming properties, the product should have an inherent viscosity of at least about 0.6. Initial modulus is determined by measuring the initial slope of the stress-strain curve. Polymer melt temperature is the minimum temperature at which a sample of the polymer leaves a wet molten trail as it is stroked with moderate pressure across a smooth surface of a heated brass block.

It will be noted in the examples and discussion which follow that the polymers of this invention offer an opportunity for chelate formation. As demonstrated in the examples, the thio compounds such as the polymer prepared from diaminopiperazine and bis(4-isothiocyanatophenyl)methane show a strong tendency to form chelates with metal salts.

The following examples illustrate some of the polymer compositions of this invention and some of the conditions under which they can be effectively produced, but are not to be construed as limiting the scope of the invention. Testing for stability on exposure to light is carried out in a Fade-Ometer, a testing instrument made by the Atlas Electric Devices Company, described in Standard Test Method 16A–56, in the Technical Manual and Year Book of the American Association of Textile Chemists and Colorists, vol. 32 (1956) page 86. The sampples are placed a distance of eight inches from the light source. Testing for fume-yellowing is carried out by exposing the sample to the off-gases from a Bunsen burner flame.

EXAMPLE I

Dry poly(tetramethylene oxide) glycol (20 parts) having a molecular weight of 1000 was reacted with 1.74 parts of 4-methyl-m-phenylene diisocyanate for three hours at 80° C. to 85° C. A low molecular weight polymer having hydroxyl end groups and containing an average of three poly(tetramethylene oxide) groups per molecule was obtained. The product obtained was then reacted with 5.00 parts of methylene bis(4-phenylisocyanate) for one hour at 80° C. to 85° C. The resulting macrodiisocyanate was dissolved in 47.4 parts of dimethylformamide, and this solution was chilled to 0° C. in an ice bath. To the cold solution was slowly added, with stirring, 1.16 parts of N,N'-diaminopiperazine in 11 parts of dimethylformamide. The reaction was kept at 0° C. for fifteen minutes, allowed to warm up to room temperature, and was then dry spun.

The as-spun properties of the resulting yarn after boil-off were:

| | |
|---|---|
| Tenacity _____grams per denier__ | 0.75 |
| Elongation _____percent__ | 720 |
| Initial modulus _____grams per denier__ | 0.04 |
| Modulus ratio (50% elongation, second cycle compared to first) _____ | 0.90 |
| Tensile recovery (50% elongation at the rate of 100% per minute, held for one minute, second cycle) _____percent__ | 98 |
| Fiber stick temperature _____°C.__ | 155 |
| Percent yellowing after 18 hrs. in gas fumes _____percent__ | 19–20 |
| Hours' exposure in Fade-Ometer to first color break _____ | 6–8 |

EXAMPLE II

A solution of 2.32 parts of N,N'-diaminopiperazine in 23.70 parts of dimethylformamide was added to a cold solution (5° C.) of 5.00 parts of methylene-bis(4-phenyl isocyanate) in 95 parts of dimethylformamide and stirred for fifteen minutes. A clear, tough film was cast directly from the polymer solution. Exposure in the Fade-Ometer caused no change after six hours and only a slight discoloring of the film after twenty-one hours.

The polymer was precipitated by pouring the dimethylformamide solution into methanol with stirring. The inherent viscosity of the polymer was 2.16 (in formic acid); polymer melt temperature was 305° C. to 310° C. A yarn was wet spun from a formic acid solution into water and, after drying, was drawn three times its original length over a hot plate at 270° C. The drawn yarn had a fiber stick temperature of 261° C., a tenacity of 2.4 grams per denier, an elongation of 21%, and an initial modulus of 43 grams per denier. It dyed readily with acid dyes to deep shades.

EXAMPLE III

To a solution of 2.44 parts of N,N-diaminopiperazine dihydrochloride, 5.23 parts of triethylamine, and 120 parts of chloroform (at 0° C.) was added, with vigorous stirring, 2.70 parts of hexahydroterephthaloyl chloride in 105 parts of chloroform (at 0° C.). The mixture was stirred for fifteen minutes, poured into an equal volume of hexane, and filtered. The solid was washed with water and with acetone, and dried in vacuo at 70° C. A 72% yield of a white, finely divided polymer having an inherent viscosity of 0.97 (in formic acid) and a polymer melt temperature greater than 400° C. was obtained.

EXAMPLE IV

To a vigorously stirred solution of 1.44 parts of N,N'-diamino-2,5-dimethylpiperazine, 2.22 parts of acetonitrile was added a solution of 2.03 parts of terephthaloyl chloride, 30 parts of chloroform, and 16 parts of acetonitrile. The mixture was stirred for five minutes, filtered, and the solid washed with water and with acetone. There was obtained a 74% yield of polymer which had an inherent viscosity of 0.70 (in sulfuric acid) and did not melt at 400° C. The polymer was soluble in formic acid. The polymer could be cast into a tough film from a formic acid solution.

EXAMPLE V

To a vigorously stirred mixture of 2.88 parts of N,N'-diamino-2,5-dimethylpiperazine, 4.24 parts of triethylamine, and 195 parts of cold (0° C.) o-dichlorobenzene in an Osterizer Blendor was added rapidly a mixture of 5.58 parts of bibenzoyl chloride and 91 parts of cold o-dichlorobenzene, and 39 parts of o-dichlorobenzene used as a rinse. The mixture was stirred for eight minutes, filtered, and the polymer washed in the Osterizer twice with water and twice with acetone. After drying overnight at 70° C. in a vacuum oven, the polymer was obtained in 99.7% yield. The polymer had an inherent viscosity of 2.60 in m-cresol and a polymer melt temperature greater than 400° C. The polymer was soluble in formic, trifluoroacetic, dichloroacetic, and sulfuric acids, and cold m-cresol. Clear, strong films were cast from the polymer.

A clear viscous dope containing 7% solids was prepared from the polymer in m-cresol and spun into methanol. The as-spun yarn extracted with methanol had only a trace of crystallinity and good orientation. The as-spun properties were as follows:

Tenacity _____grams per denier__ 2.2
Elongation _____percent__ 11
Initial modulus _____grams per denier__ 77
Fiber stick temperature _____°C__ 339

The fiber dyed well with acid and dispersed dyes at 100° C. using standard dyeing procedures.

EXAMPLE VI

A polyetherurethane glycol was obtained by reacting two moles of poly(tetramethylene oxide)glycol with one mole of tolylene-2,4-diisocyanate. One portion of the product obtained was then reacted with tolylene-2,6-diisocyanate and another portion was reacted with methylene-bis-(4-phenylisocyanate). Copolyureaether elastomer filaments were then prepared as described in Example I using hydrazine, N,N'-diaminopiperazine and N,N'-diamino-2,5-dimethylpiperazine with the resulting properties shown in the following table in which the filaments of Group A were prepared using tolylene-2,6-diisocyanate and the filaments of Group B were prepared using methylene-bis-(4-phenylisocyanate).

Five percent (based on the weight of the polymer) of a stabilizer of the type described in the copending application of Blake et al. U.S. application Serial No. 709,445, filed January 17, 1958, was added as shown in the table.

Table

| | Additives | (1) FST, °C. | (2) T, dry | (2) T, wet | (3) E, dry | (3) E, wet | (4) M$_i$, dry | (4) M$_i$, wet | (5) Decay of Stress 50/1/2 | (5) Decay of Stress 100/1,200/1 | (6) Tensile Recovery 50/1/2 | (6) Tensile Recovery 100/1,200/1 | (7) Percent Yellowing, 18 hrs. | (8) Hrs. Exp. Fade-Ometer |
|---|---|---|---|---|---|---|---|---|---|---|---|---|---|---|
| Group A Diamine: | | | | | | | | | | | | | | |
| Hydrazine | TiO$_2$ | 150 | 0.58 | 0.32 | 900 | 850 | 0.07 | 0.07 | 8.0 | 38 | 95 | 86 | 23 | 4 |
| DAPip (a) | TiO$_2$ | 150 | 0.55 | 0.31 | 650 | 600 | 0.07 | 0.05 | 7.0 | 38 | 94 | 89 | 16 | 8 |
| DADMePip (b) | TiO$_2$ | 150 | 0.73 | 0.22 | 680 | 600 | 0.05 | 0.05 | 6.6 | 43 | 95 | 95 | 16 | 8 |
| Hydrazine | Dak"B" | 150 | 0.60 | 0.38 | 920 | 900 | 0.09 | 0.07 | 6.8 | 42 | 95 | 86 | 23 | 4 |
| DAPip | Dak"B" | 150 | 0.60 | 0.30 | 680 | 620 | 0.07 | 0.06 | 7.2 | 40 | 94 | 87 | 16 | 8 |
| DADMePip | Dak"B" | 150 | 0.60 | 0.20 | 680 | 620 | 0.04 | 0.04 | 8.6 | 40 | 93 | 83 | 16 | 8 |
| Hydrazine | TiO$_2$+Dak"B" | 155 | 0.78 | 0.40 | 980 | 900 | 9.08 | 0.07 | 7.8 | 40 | 96 | 88 | 17 | 8 |
| DAPip | TiO$_2$+Dak"B" | 155 | 0.58 | 0.29 | 670 | 600 | 0.06 | 0.05 | 6.8 | 42 | 95 | 89 | 16 | 20 |
| DADMePip | TiO$_2$+Dak"B" | 150 | 0.70 | 0.20 | 730 | 650 | 0.05 | 0.04 | 8.0 | 42 | 95 | 83 | 16 | 20 |
| Group B Diamine: | | | | | | | | | | | | | | |
| Hydrazine | TiO$_2$+Dak"B" | 180 | 0.65 | 0.43 | 780 | 800 | 0.04 | 0.04 | 8.0 | 40 | 94 | 89 | 30 | 4 |
| DAPip | TiO$_2$+Dak"B" | 155 | 0.68 | 0.35 | 620 | 630 | 0.04 | 0.04 | 5.2 | 40 | 96 | 90 | 16 | 20 |
| DADMePip | TiO$_2$+Dak"B" | 145 | 0.75 | 0.20 | 650 | 680 | 0.04 | 0.04 | 7.8 | 40 | 96 | 85 | 16 | 20 |

Diamine:
   (a) DAPip=N,N'-Diaminopiperazine
   (b) DADMePip=N,N'-Diamino-2,5-dimethylpiperazine
Additives:
   TiO$_2$=Titanium dioxide
   Dak"B"=Daktose "B"—Poly(N,N-diethyl-beta-aminoethylmethacrylate)
(1) FST=Fiber Stick Temperature.
(2) T=Tenacity (at 70° F., 65% relative humidity).
(3) E=Elongation (at 70° F., 65% relative humidity).
(4) M$_i$=Initial Modulus (at 70° F., 65% relative humidity).
(5) Decay of Stress=From $x$% elongation for $y$ minutes holding time on the $z$ cycle.
(6) Tensile Recovery=From $x$% elongation for $y$ minutes holding time on the $z$ cycle.
(7) Yellowing % in 18 hrs. in gas fumes as determined against a magnesium oxide standard.
(8) Hours of exposure in Fade-Ometer to first color break.

As previously indicated, many polymers of this invention have chelate-forming properties. In particular, the polymers containing the linkage

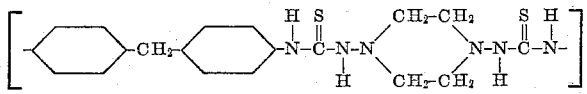

show a strong tendency to chelate with such metal salts as silver, lead, mercury, copper, nickel, etc., to give polymeric chelates. These polymers can be formed into fibers, films, and the like, according to the procedure described in the preceding examples to give products having unusual and valuable properties. The following example further illustrates this aspect of the present invention.

EXAMPLE VII

In a 3-necked flask cooled with an ice bath was placed 150 parts of thiophosgene and 1000 parts of ice water. A solution of 87 parts of 4,4'-diaminodiphenyl-methane in 1500 parts of chloroform was added with stirring during a period of about one hour. The mixture was stirred at 0–10° C. for an additional two hours, then at room temperature overnight. The chloroform layer was separated and evaporated to dryness under a stream of nitrogen. The solid residue was dissolved in a mixture consisting of 360 parts of benzene and 622 parts of cyclohexane at the boiling point. The solution was decolorized, filtered, and allowed to crystallize. The fine needle-like precipitate was filtered, washed with cold cyclohexane and recrystallized a second time from benzene-cyclohexane as described above. The yield of pure methylene-bis-(4-phenyl isothiocyanate) was 47 parts with a melting point of 141°–142° C. which was used to prepare a polythiohydrazide.

In preparing this polymer, 56.4 parts of product prepared as described above were added to a solution of 23.2 parts of diaminopiperazine in 660 parts of dimethyl sulfoxide at about 50° C. The mixture rapidly became viscous, and the heating and stirring were discontinued after two hours. The next day the polymer was isolated by precipitation in water and was then chopped up in a Waring Blendor, washed thoroughly in water and dried. The yield was quantitative, and the product had an inherent viscosity of 1.07 in dimethyl sulfoxide.

This polymerization was repeated with viscosities as high as 1.8 being obtained. It was found that diaminopiperazine which had been recrystallized from chlorobenzene was much more satisfactory than sublimed material. This polymer dissolved readily in dimethyl sulfoxide and could be cast to clear, tough films from this solvent. The film could be drawn two to three times its original length at about 175° C.

EXAMPLE VIII

A nickel chelate was prepared as follows:

To a solution of the polythiohydrazide prepared in Example VI was added some crystalline nickel chloride. The polymer solution was then cast to a film which was yellowish green and quite tough. However, the polymer was still soluble in dimethyl sulfoxide, indicating that chelation had not taken place. In another experiment, 0.5 gram of the polymer was dissolved in 5 cc. of dimethyl sulfoxide at room temperature. To the solution was added 0.3 gram of nickel chloride and the mixture was heated to about 120° C. The initially pale yellowish-green solution turned very dark green and set to a lump of gel.

EXAMPLE IX

Addition of copper chloride to a solution of the polythiohydrazide (described in Example VII) in dimethyl sulfoxide gave an immediate precipitation of a purple-gray lump of insoluble copper chelate. Extrusion of a polymer solution in dimethyl sulfoxide into dimethylformamide containing a small amount of copper chloride gave the immediate precipitation of the extruded stream as a coherent filament insoluble in the solvent. Using wet-spinning equipment, it was found possible to spin continuously a solution of 10 parts of polymer in 100 parts of dimethyl sulfoxide into a solution of 180 parts of copper chloride in 55,000 parts of dimethylformamide. Spinning was quite satisfactory, and the bronze-colored yarn was wound up continuously. It was boiled off for one hour in water, and the physical properties were measured. The filaments had a tenacity of 1.1 grams per denier and contained 6.1% of chelated copper. The spinning bath was altered by the addition of 108 parts of triethylamine. Spinning was still continuous, and the fiber was jet black. It could be wound up, but it was quite weak and brittle. The percent copper by analysis was 13.0%.

The wet-spun polythiohydrazide had a fiber stick temperature of the order of 205° C. However, the copper containing chelate fibers had fiber stick temperatures in the range of 250° C. to 260° C.

EXAMPLE X

It was ordered that a solution of the polythiohydrazide in dimethylformamide was compatible with lead nitrate. The addition of triethylamine to the solution, however, gave a slow precipitation of a polymer which was found to be a lead chelate.

Two (2.0) parts of the thiohydrazide were then dissolved in 16.5 parts of dimethyl sulfoxide and 1.6 parts of lead nitrate were added. A film was cast and dried at 100° C. The infrared spectrum of the as-cast film showed very strong evidence for the presence of nitrate ions. A sample of this film was boiled with dilute aqueous piperidine, and the infrared spectrum of the extracted material was measured. All evidence for the nitrate group had disappeared. The sample of film before extraction with piperidine contained 18.1% by weight of lead. The sample after extraction with aqueous piperidine contained about 18.5% lead.

In addition to the difunctional coreactants set forth in the preceding examples, other coreactants may be prepared by reacting bischloroformates of glycols such as ethylene glycol, cyclohexanediol, propylene glycol, butyleneglycol, 2,2-dimethylpropanediol, or the polyether glycols with a primary or secondary diamine such as hexamethylenediamine, 1,4-diamino cyclohexane, p-phenylenediamine, ethylenediamine, propylenediamine, butylenediamine, and piperazine. In the preparation of elastomeric filaments, the aliphatic diamines such as ethylene-, propylene-, butylene-, pentamethylene-, hexamethylene-, and N,N'-diisobutylhexamethylenediamine are preferred. As illustrated in the foregoing examples, this type of intermediate may be prepared by reacting a diisocyanate with a polyether having a molecular weight above about 700.

In preparing low molecular weight polyesters by reacting acids, esters, or acid halides with glycols, suitable glycols include the polymethylene glycols, for example, ethylene, propylene, butylene, decamethylene; substituted polymethylene glycols such as 2,2-dimethyl-1,3-propanediol; and cyclic glycols such as cyclohexane glycol. These glycols may be reacted with the proper molar ratio of aliphatic, cycloaliphatic or aromatic acids or their ester-forming derivatives to produce the low molecular weight polymers. Suitable acids for preparing polyesters or copolyesters include succinic, adipic, suberic, sebacic, terephthalic, isophthalic, and hexahydroterephthalic, as well as the alkyl- and halogen-substituted derivatives of these acids. The diacid halide derivatives of these acids have been found to be useful in preparing "dimers" and "trimers," i.e., low molecular weight polymers containing two or three macroglycol units, with acid halide ends, which in turn have been found to be useful for preparing the elastomeric polymers of this invention.

Among the hydrocarbons from which the macro-intermediates may be selected are polyisobutylene dicarboxylic acids, polyisoprene, polybutadiene, and similar derivatives terminated with amine groups such as those described in U.S. Patent 2,647,146. Of course, the low molecular weight polymers, i.e., the macro-intermediates, must be reacted with suitable reagents to provide them with difunctional endings such as acid chloride, diisocyanate, and like groups capable of reacting with diaminopiperazine. Polysiloxanes having a molecular weight of 3000 to 4000 may be prepared by polymerizing dihalodialkyl silanes in the presence of a monobromoalkyl or monobromoaryl-dialkyl halosilane and converted to nitriles by reacting them with sodium cyanide to produce another useful class of macro-intermediates. The nitriles must, of course, be reduced to the corresponding amines or hydrolyzed to the corresponding acids and be provided with suitable end groups.

In addition to poly(tetramethyleneoxide) glycol used in the preparation of polyethers, polyglycols of other alkylene oxides such as ethylene-, propylene-, penta-methylene-, hexa-methylene-, hepta-methylene-, octa-methylene-, nona-methylene-, and poly-decamethylene-oxide glycol, as well as the dicarboxy-methyl acids of poly(alkylene oxides) or their esters may be substituted in like amounts in the foregoing examples. Formals prepared by reacting formaldehyde with other glycols such as polydioxolane may also be used.

Suitable acid halides are those derived from polycarboxylic and polysulfonic acids, such as oxalic, succinic, adipic, suberic, azaleic, sebacic, isophthalic, terephthalic, hexahydroterephthalic, 1,5-naphthalenedisulfonic, 1,2-ethanedisulfonic, and 1,6-hexanedisulfonic acids. Suitable organic diisocyanates which may be employed include aromatic, aliphatic, and cycloaliphatic diisocyanates and combinations of these types. Representative compounds include 4-methyl-m-phenylene diisocyanate, m-phenylene diisocyanate, 4,4'-biphenylene diisocyanate, methylene bis(4-phenylisocyanate), 4-chloro-1,3-phenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl-isocyanate), and 1,5-tetrahydronaphthalene diisocyanate. Arylene diisocyanates, i.e., those in which each of the isocyanate groups is attached directly to an aromatic ring are preferred. In general, they react more rapidly than do the alkylene diisocyanates. The diisocyanates may contain other substituents, although those which are free from reactive groups other than the two isocyanate groups are ordinarily preferred. In the case of the aromatic compounds, the isocyanate groups may be attached either to the same or to different rings. These same considerations apply to the diacid halides just discussed. Dimers of the monomeric diisocyanates and di(isocyanatoaryl)ureas, such as di(3-isocyanato-4-methylphenyl)urea may be used.

As previously indicated, a variety of active ends on the low molecular weight polymers are suitable for reaction with diaminopiperazine. These include acid halide, haloformate, carboxyl, ester, ketene, and isocyanate. Of these, the acid halide and the isocyanate groups are the most useful. These end groups can be provided as a result of the method of preparation of the low molecular weight polymer. For example, a polyamide with acid halide ends can be obtained by reacting a diamine with an excess of diacid halide under the proper conditions to prepare a low molecular weight polymer with acid halide ends.

These end groups can also be provided by reacting small difunctional molecules with a coreactive low molecular weight polymer which does not contain suitable end groups for reacting with diaminopiperazine. For example, a low molecular weight polyether glycol can be reacted with sufficient diisocyanate to produce a polyether diurethane with isocyanate ends. Similarly, the polyhydrocarbon diamines referred to earlier can be converted to diisocyanates by the usual methods, such as reacting them with phosgene and then dehydrohalogenating them.

A small molecule having end groups which are the same as, or equivalent in reactivity to the end groups of the macro-intermediates may be included in the mixture of monomers used to prepare the polymers. For example, a polyether which has been provided with isocyanate end groups with methylene-bis(4-phenylisocyanate) may be mixed with excess methylene-bis(4-phenylisocyanate) and reacted with N,N'-diaminopiperazine as described in Example I. The aromatic diisocyanate reacts with some of the diaminopiperazine to form a segment of a high-melting polymer which is connected at each end to a molecule of the macro-intermediate. This type of polymer is referred to as a "segmented" copolymer.

A different type of copolymer is obtained if another compound, having active hydrogen atoms, is added along with the diaminopiperazine to react with the low molecular weight polymeric coreactant. In this case, the product is a random copolymer in which some of the linkages between the low molecular weight polymer units are derived from diaminopiperazine, and the remaining linkages are derived from the added compound containing the active hydrogen atoms. Such compounds include diamines, dicarboxylic acids and glycols. Of these, the diamines, e.g., ethylene- and propylene-diamine, are the most useful since they possess reactivities more nearly like that of diaminopiperazine.

As indicated in the examples, the polymers of this invention may be prepared in filament and film form by conventional procedures. The polymers are soluble in a variety of organic polar solvents such as m-cresol, formic, trifluoroacetic, dichloroacetic, and sulfuric acids, dimethylformamide, dimethylacetamide, dimethyl sulfoxide, tetramethylene sulfoxide, N-methyl pyrrolidone, tetramethylurea, dimethyl tetramethylene sulfone, etc., and may be dry spun using conventional equipment. The filaments may also be wet spun into a coagulating bath containing water which may be mixed with minor amounts of one or more of the above solvents. Films may likewise be extruded under similar conditions. If desired, the shaped articles may be drawn from two to ten times their original length to improve physical properties.

The polymers of the present invention have a structural feature and improved properties which have not heretofore been obtained in high molecular weight condensation polymers. This feature, which results from the novel linking units, confers on the polymers a number of desirable and advantageous properties. As indicated in the examples and in the preceding discussion, the polymers have good dyeability, high solubility, and excellent stability on exposure to light and fumes. In these regards, they surpass polymers prepared from diamine reactants previously used. Since the polymers of this invention can readily be obtained in high molecular weight form, these advantages can be realized in commercial products such as elastic threads and fabrics, non-elastic yarns and textile fabrics, and films, ribbons, and the like.

Throughout the specification and claims, any reference to parts, proportions and percentages refers to parts, proportions and percentages by weight unless otherwise specified.

It will be apparent that many widely different embodiments of this invention may be made without departing from the spirit and scope thereof, and therefore it is not intended to be limited except as indicated in the appended claims.

I claim:

1. A synthetic polymer which consists essentially of repeating units represented by the general formula

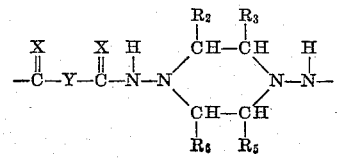

wherein X is selected from the group consisting of oxygen and sulfur, $R_2$, $R_3$, $R_5$, and $R_6$ are selected from the group consisting of hydrogen and lower alkyl, and Y is a divalent organic radical identical to that remaining after removal of the terminal

containing portions of the terminal reactive groups of a difunctional organic compound having two identical terminal reactive groups selected from the class consisting of acid halide, haloformate, carboxyl, ester, ketene, and isocyanate groups, said groups being reactive with a diaminopiperazine of the formula

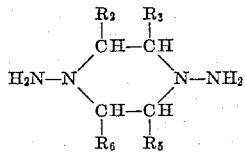

to form an intralinear group of the formula

$R_2$, $R_3$, $R_5$, $R_6$, and X having the significance defined above.

2. A polymer of claim 1 wherein said compound is a low molecular weight polymer having a molecular weight greater than 700.

3. A polymer of claim 2 wherein said low molecular weight polymer is a polyurethane obtained by reacting a polyether glycol with a diisocyanate.

4. A polymer of claim 2 wherein the molecular weight of said difunctional organic compound is between about 800 and about 8000.

5. A polymer of claim 3 wherein said polyether glycol is aliphatic.

6. A polymer of claim 1 wherein $R_2$, $R_3$, $R_5$, and $R_6$ are hydrogen.

7. A polymer of claim 1 wherein $R_2$, and $R_5$ are methyl and $R_3$ and $R_6$ are hydrogen.

8. A polymer of claim 1 wherein said difunctional organic compound is a dicarboxylic acid halide.

9. A polymer of claim 1 wherein said difunctional organic compound is bis-(4-isothiocyanatophenyl)methane.

10. A polymer of claim 1 in the form of a fiber.

11. A polymer of claim 1 in the form of a film.

References Cited in the file of this patent

UNITED STATES PATENTS

| | | |
|---|---|---|
| 2,663,707 | Conroy et al. | Dec. 22, 1953 |
| 2,708,617 | Magat et al. | May 17, 1955 |
| 2,831,834 | Magat | Apr. 22, 1958 |
| 2,957,852 | Frankenburg et al. | Oct. 25, 1960 |

FOREIGN PATENTS

| | | |
|---|---|---|
| 956,198 | France | July 18, 1949 |
| 529,414 | Belgium | June 30, 1954 |

OTHER REFERENCES

Beilstein: Handbuch der Organischen Chemie, vol. 23, first supplement, page 7 (1936).